United States Patent
Jiang et al.

(10) Patent No.: US 12,527,872 B2
(45) Date of Patent: Jan. 20, 2026

(54) PEGYLATED ICD INDUCER-IDO INHIBITOR NANOCONJUGATE, AND PREPARATION METHOD AND USE THEREOF

(71) Applicant: SHANDONG UNIVERSITY, Shandong (CN)

(72) Inventors: Xinyi Jiang, Jinan (CN); Wei Du, Jinan (CN); Chen Chen, Jinan (CN); Jing Zhang, Jinan (CN); Chunwei Tang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 853 days.

(21) Appl. No.: 17/785,162

(22) PCT Filed: Nov. 2, 2020

(86) PCT No.: PCT/CN2020/125925
§ 371 (c)(1),
(2) Date: Jun. 14, 2022

(87) PCT Pub. No.: WO2021/129160
PCT Pub. Date: Jul. 1, 2021

(65) Prior Publication Data
US 2023/0036412 A1 Feb. 2, 2023

(30) Foreign Application Priority Data
Dec. 23, 2019 (CN) .......................... 201911338596.5

(51) Int. Cl.
*A61K 47/60* (2017.01)
*A61K 31/555* (2006.01)
*B82Y 5/00* (2011.01)

(52) U.S. Cl.
CPC ............ *A61K 47/60* (2017.08); *A61K 31/555* (2013.01); *B82Y 5/00* (2013.01)

(58) Field of Classification Search
CPC ...................................................... A61K 47/60
See application file for complete search history.

(56) References Cited

FOREIGN PATENT DOCUMENTS

| CN | 106046062 A | 10/2016 |
| CN | 106074379 A | 11/2016 |
| CN | 106349437 A | 1/2017 |
| CN | 106999557 A | 8/2017 |
| CN | 107001031 A | 8/2017 |
| CN | 109988297 A | 7/2019 |
| CN | 111012919 A | 4/2020 |
| WO | 2018/213631 A1 | 11/2018 |
| WO | 2019/173391 A1 | 9/2019 |

OTHER PUBLICATIONS

Du et al. Nanoscale 2020, 12, 3317-3329 (Year: 2020).*
Lian et al. Macromolecules 2010, 43, 7434-7445 (Year: 2010).*
Zhu et al., "Amplification of tumor antigen presentation by NLGplatin to improve chemoimmunotherapy," International Journal of Pharmaceutics, 2020, vol. 573, 118736, pp. 1-8.
Feng et al., "Binary Cooperative Prodrug Nanoparticles Improve Immunotherapy by Synergistically Modulating Immune Tumor Microenvironment," Advanced Materials, 2018, 1803001, pp. 1-10.
"Chemical Synthesis," Advanced Topics in Medicinal Chemistry, 2012, Warning Scientific University Press, pp. 221-225.
Wang et al., "Protection of N-Amino," Protein Chemistry, Tongji University Press, 2012, pp. 77-78.
Sep. 18, 2020 Office Action issued in Chinese Patent Application No. 201911338596.5.
Feb. 4, 2021 International Search Report issued in International Patent Application No. PCT/CN2020/125925.
Feb. 4, 2021 Written Opinion of the International Searching Authority issued in International Patent Application No. PCT/CN2020/125925.

* cited by examiner

*Primary Examiner* — Matthew P Coughlin
(74) *Attorney, Agent, or Firm* — Oliff PLC

(57) ABSTRACT

A PEGylated ICD inducer-IDO inhibitor nanoconjugate and a preparation method and use thereof. The nanoconjugate has a structural formula as follows:

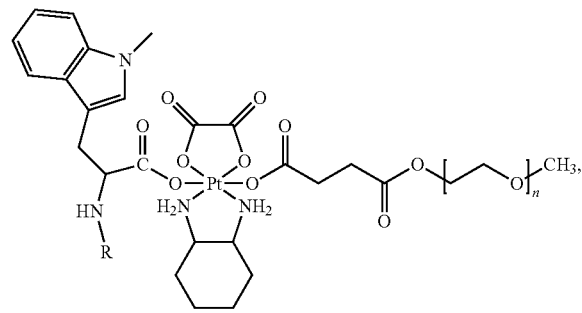

where R is H or

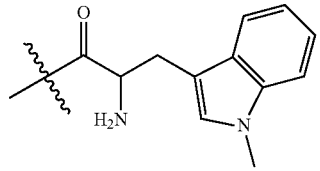

with a weight-average molecular weight of 1000-5000. For the PEGylated ICD inducer-IDO inhibitor nanoconjugate provided in an aqueous medium, the PEGylated drug conjugate can self-assemble into a drug-based nanoconjugate, which can not only reduce non-specific accumulation in MPS-related organs, but also improve the passive targeting capability to solid tumors through the enhanced permeability and retention effect, thereby increasing the therapeutic index.

14 Claims, 7 Drawing Sheets

PEGYLATED ICD INDUCER-IDO INHIBITOR NANOCONJUGATE, AND PREPARATION METHOD AND USE THEREOF

TECHNICAL FIELD

The present invention relates to a PEGylated ICD inducer-IDO inhibitor nanoconjugate, and a preparation method and use thereof.

BACKGROUND

Information disclosed in the background section is merely for better understanding of the overall background of the present invention, and is not necessarily regarded as acknowledging or suggesting, in any form, that the information constitutes the prior art known to a person of ordinary skill in the art.

Breast cancer is one of the most commonly diagnosed malignancies and the leading cause of cancer death in women. At present, chemotherapy remains the foundation of modern cancer treatment. Specialized chemotherapy, such as oxaliplatin (OXA), can induce true immunogenic cell death (ICD) in cancer cells. ICD-elicited immunogenicity can promote tumor infiltration of cytotoxic T lymphocytes (CTLs) and accelerate tumor regression. However, breast cancer, also known as a tumor that is "cold" to immune response, has an immunosuppressive tumor microenvironment with low efficiency of infiltration of lymphocytes. Therefore, the effectiveness of chemotherapy-induced ICD is inevitably limited due to breast malignancies "cold" to immune response.

As one of the most attractive strategies to overcome the immunosuppressive tumor microenvironment and stimulate CTLs, the advent of cancer immunotherapy, especially immune checkpoint blockade (ICB), has already improved current cancer treatments. Therefore, the co-action of ICB and chemotherapeutics that can induce ICD can eliminate immune resistance by simultaneously increasing chemotherapy-elicited immunogenicity and changing immune state of tumor sites from "cold" to "hot", thereby synergistically enhancing breast cancer therapy.

As a leading immune-resistance checkpoint in cancer cells, indoleamine-2,3-dioxygenase (IDO) can catabolize tryptophan (Trp) into kynurenine (Kyn), resulting in immune anergy and production of regulatory T (Treg) cells. Unlike other checkpoint blockade strategies, the IDO pathway can modulate "upstream" immune responses based on the activation of antigen-presenting cells and the initial cross-presentation of tumor antigens. Preclinical IDO inhibitors such as 1-methyl-D-tryptophan (1-MT) have shown compelling potential to enhance the efficacy of immunotherapy.

However, it was found by the inventor that, first, the delivery of OXA and 1-MT combination is cumbersome; and second, both OXA and 1-MT are hydrophobic drugs, which not only easily cause non-specific accumulation in MPS-related organs (such as liver and spleen), but also have poor therapeutic effects.

SUMMARY

To overcome the defects in the related art, an objective of the present invention is to provide a PEGylated ICD inducer-IDO inhibitor nanoconjugate, and a preparation method and use thereof. A novel amphiphilic drug derivative is synthesized by coupling hydrophobic drugs OXA and 1-MT with hydrophilic PEG. In an aqueous medium, the PEGylated drug conjugate can self-assemble into a drug-based nanoconjugate (DNH), which can not only reduce non-specific accumulation in MPS-related organs (such as liver and spleen), but also improve the passive targeting capability to solid tumors through the enhanced permeability and retention (EPR) effect, thereby increasing the therapeutic index.

To achieve the foregoing objective, the present invention provides the following technical solutions:

According to a first aspect, the present invention provides a PEGylated ICD inducer-IDO inhibitor nanoconjugate with a structural formula:

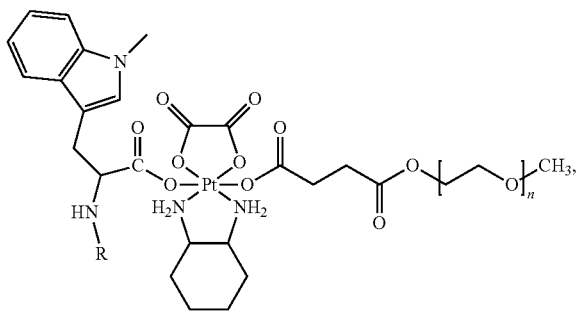

where R is H or

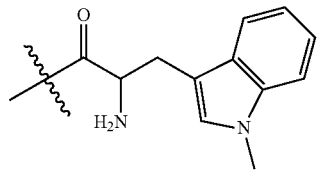 [SMILES: *C(=O)C(N)Cc1cn(C)c2ccccc12]

with a weight-average molecular weight of 1000-5000.

According to a second aspect, the present invention provides a method for preparing the PEGylated ICD inducer-IDO inhibitor nanoconjugate, the method including: oxidizing oxaliplatin (OXA) to OXA oxide, modifying a hydroxyl group at an end of polyethylene glycol (PEG) into a carboxyl group with succinic acid or a derivative of succinic acid to obtain carboxylated PEG, carrying out esterification on the OXA oxide and the carboxylated PEG to obtain PEGylated OXA, and carrying out esterification on the PEGylated OXA and 1-methyl-D-tryptophan (1-MT) or a dimer of 1-MT, where the structural formula of the OXA oxide is

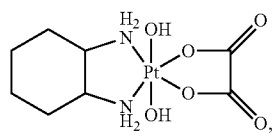

the structural formula of the carboxylated PEG is

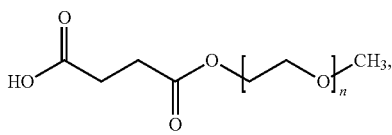

the structural formula of the PEGylated OXA is

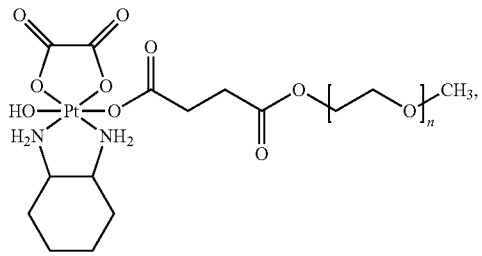

and
the structural formula of the dimer of 1-MT is

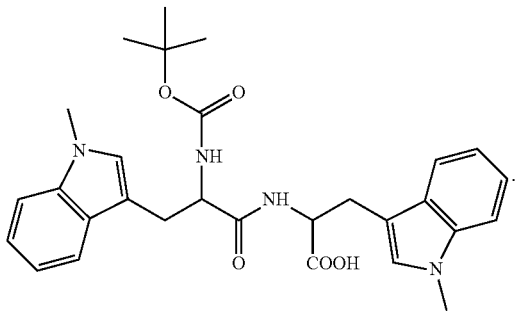 [SMILES: Cn1cc(CC(NC(=O)C(Cc2cn(C)c3ccccc23)NC(=O)OC(C)(C)C)C(=O)O)c2ccccc21]

According to a third aspect, the present invention provides use of the PEGylated ICD inducer-IDO inhibitor nanoconjugate in preparing drugs for tumor treatment.

According to a fourth aspect, the present invention provides use of the PEGylated ICD inducer-IDO inhibitor nanoconjugate in a single-drug delivery system.

The present invention has the following beneficial effects:

1. The present invention provides a PEGylated ICD inducer-tryptophan metabolism blocker conjugate that can achieve similar single-drug delivery in tumor treatment. The conjugate includes an ICD-inducing chemotherapeutic agent that can elicit a strong effector T-cell immune response, and an IDO inhibitor that blocks the metabolism of tryptophan to kynurenine.

2. In the present invention, a novel amphiphilic drug derivative is synthesized by coupling hydrophobic drugs OXA and 1-MT with hydrophilic PEG. In an aqueous medium, the PEGylated drug conjugate can self-assemble into a drug-based nanoconjugate (DNH), which can not only reduce non-specific accumulation in MPS-related organs (such as liver and spleen), but also improve the passive targeting capability to solid tumors through the enhanced permeability and retention (EPR) effect, thereby increasing the therapeutic index.

3. In the present invention, a diMT-OXA(IV)-PEG nanoconjugate that belongs to different action mechanisms and can be used synergistically for anti-cancer treatment is synthesized for the first time, which brings great convenience for synergistic drug delivery.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
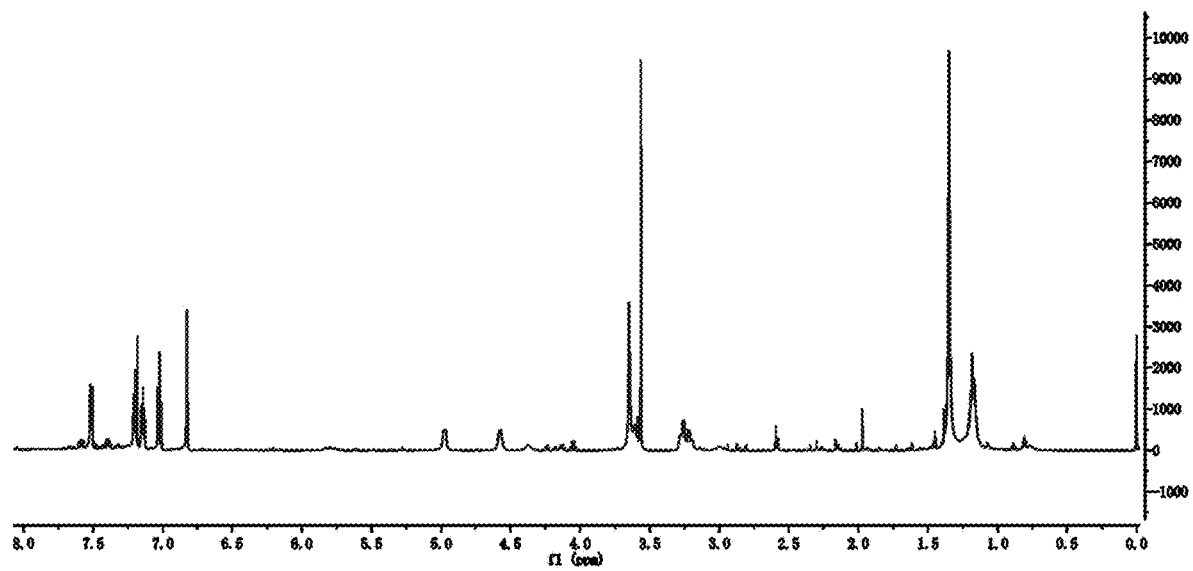
FIG. 1 shows the $^1$H NMR spectrum of 1-MT-Boc prepared in Example 1 of the present invention.

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

In view of the cumbersome delivery of combination of two drugs with an additional carrier, the present invention provides a PEGylated ICD inducer-IDO inhibitor nanoconjugate, a preparation method and use thereof.

In an exemplary implementation of the present invention, a PEGylated ICD inducer-IDO inhibitor nanoconjugate is provided with a structural formula:

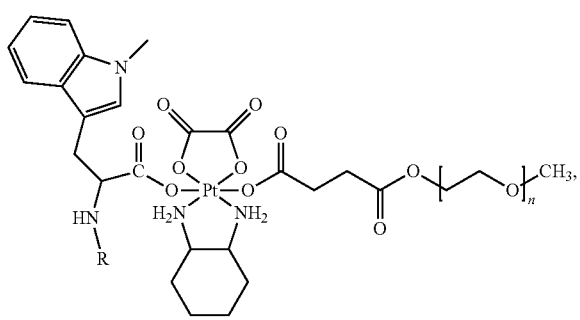

where R is H or

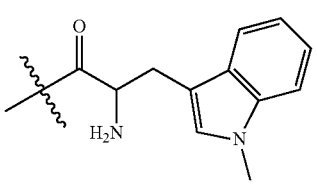 [SMILES: *C(=O)C(N)Cc1cn(C)c2ccccc12]

with a weight-average molecular weight of 1000-5000.

In another implementation of the present invention, a method for preparing the PEGylated ICD inducer-IDO inhibitor nanoconjugate is provided, the method including: oxidizing oxaliplatin (OXA) to OXA oxide, modifying a hydroxyl group at an end of polyethylene glycol (PEG) into a carboxyl group with succinic acid or a derivative of succinic acid to obtain carboxylated PEG, carrying out esterification on the OXA oxide and the carboxylated PEG to obtain PEGylated OXA, and carrying out esterification on the PEGylated OXA and 1-methyl-D-tryptophan (1-MT) or a dimer of 1-MT, where the structural formula of the OXA oxide is

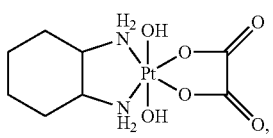

the structural formula of the carboxylated PEG is

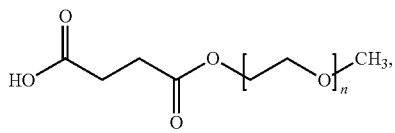

the structural formula of the PEGylated OXA is

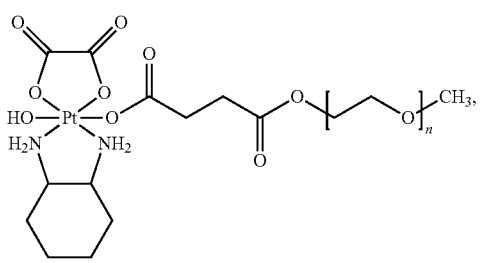

and
the structural formula of the dimer of 1-MT is

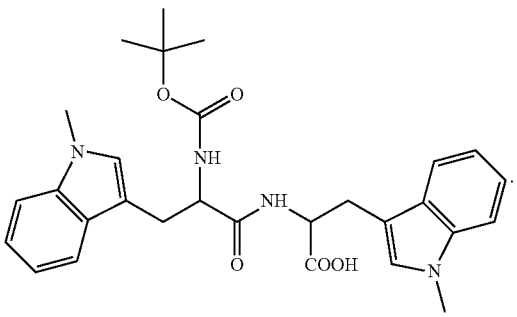 [SMILES: Cn1cc(CC(NC(=O)C(Cc2cn(C)c3ccccc23)NC(=O)OC(C)(C)C)C(=O)O)c2ccccc21]

It was found through experiments that 1-MT or a dimer of 1-MT can be linked to PEGylated OXA through reaction, but a polymer formed by three or more 1-MTs cannot be linked to PEGylated OXA through reaction.

In order to increase the loading efficiency of 1-MT, it is generally better to use a dimer of 1-MT to link to PEGylated OXA through reaction.

In one or more embodiments of the implementation, OXA is oxidized to OXA oxide with an aqueous hydrogen peroxide solution.

In this series of embodiments, the aqueous hydrogen peroxide solution contains 25-35% of hydrogen peroxide.

In one or more embodiments of the implementation, a catalyst used for the esterification is HTBU.

In this series of embodiments, the esterification is carried out at room temperature. In the present invention, the room temperature refers to an indoor ambient temperature, which is generally 15-30° C.

In one or more embodiments of the implementation, a solvent used for the esterification is N,N-dimethylformamide (DMF).

In one or more embodiments of the implementation, after the carrying out esterification on the PEGylated OXA and 1-methyl-D-tryptophan (1-MT) or a dimer of 1-MT, the method further includes: suspending the obtained material in a dichloromethane solution containing trifluoroacetic acid, air drying, adding cold diethyl ether dropwise, dissolving it with dichloromethane, and carrying out centrifugation to obtain a precipitate.

In one or more embodiments of the implementation, the dimer of 1-MT is prepared by: protecting an amino group of 1-MT with a protecting group, and adding 1-MT to carry out amidation.

In this series of embodiments, the protecting group is tert-butyloxycarbonyl (BOC).

In this series of embodiments, the protecting is carried out with the protecting group by: reacting 1-MT with BOC anhydride under basic conditions. During the reaction, the two are mixed first in an ice bath and then react at room temperature. The time for ice bath is 5-15 min, and the time for reaction at room temperature is 20-28 h.

In this series of embodiments, a catalyst used for the amidation is N,N-diisopropylethylamine (DIPEA) and HBTU.

In this series of embodiments, the amidation is carried out for 20-28 h.

In this series of embodiments, hydrochloric acid is added to terminate the amidation after a specified time.

In this series of embodiments, the material obtained after the amidation is washed with water and then purified by silica gel column chromatography.

In this series of embodiments, a mobile phase for the silica gel column chromatography is a mixture of dichloromethane and methanol. The purification effect is better when the volume ratio of dichloromethane to methanol is 10:(0.9-1.1).

According to a third implementation of the present invention, use of the PEGylated ICD inducer-IDO inhibitor nanoconjugate in preparing drugs for tumor treatment is provided.

According to a fourth implementation of the present invention, use of the PEGylated ICD inducer-IDO inhibitor nanoconjugate in a single-drug delivery system is provided.

In order to enable a person skilled in the art to understand the technical solutions of the present invention more clearly, the technical solutions of the present invention will be described in detail below with reference to specific examples.

Example 1

Figure 2:
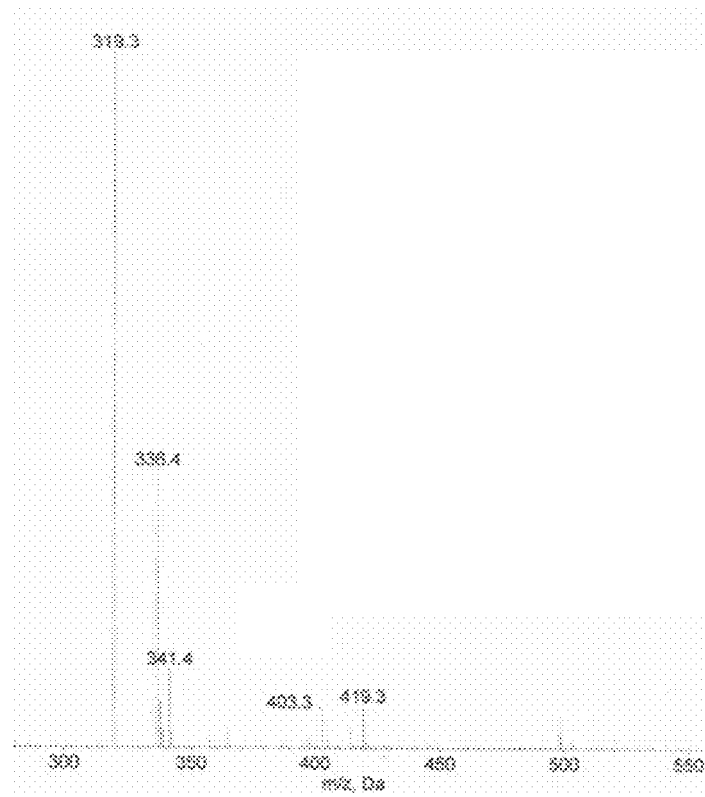
FIG. 2 shows the ESI-MS spectrum of 1-MT-Boc prepared in Example 1 of the present invention.

(1) Synthesis of 1-MT-Boc:

57.74 mg of sodium bicarbonate powder was precisely weighed out and added into a clean and dry 5 mL round-bottom flask with a ground glass joint together with 2 mL of distilled water and 2 mL of THF, and then mixed uniformly. The mixture was stirred with a stirrer to dissolve sodium bicarbonate. 50.9 mg of NLG-8189 and 60 mg of BOC powder were precisely weighed out and added successively into the mixture in the 5 mL round-bottom flask with a ground glass joint, maintained in an ice bath for 10 min, and then stirred at room temperature to react for 24 h. Then, THF was removed by rotary evaporation. The reaction solution was adjusted to pH 1 with 1 mol/L HCl, ethyl acetate was then added thereto, and the resultant solution was transferred into a separatory funnel. After three extractions, supernatants were combined, to which was added an appropriate amount of anhydrous sodium sulfate to remove water. After standing overnight, ethyl acetate was removed by rotary evaporation, to obtain 1-MT-Boc with structure characterization shown in FIG. 1 and FIG. 2.

Figure 3:
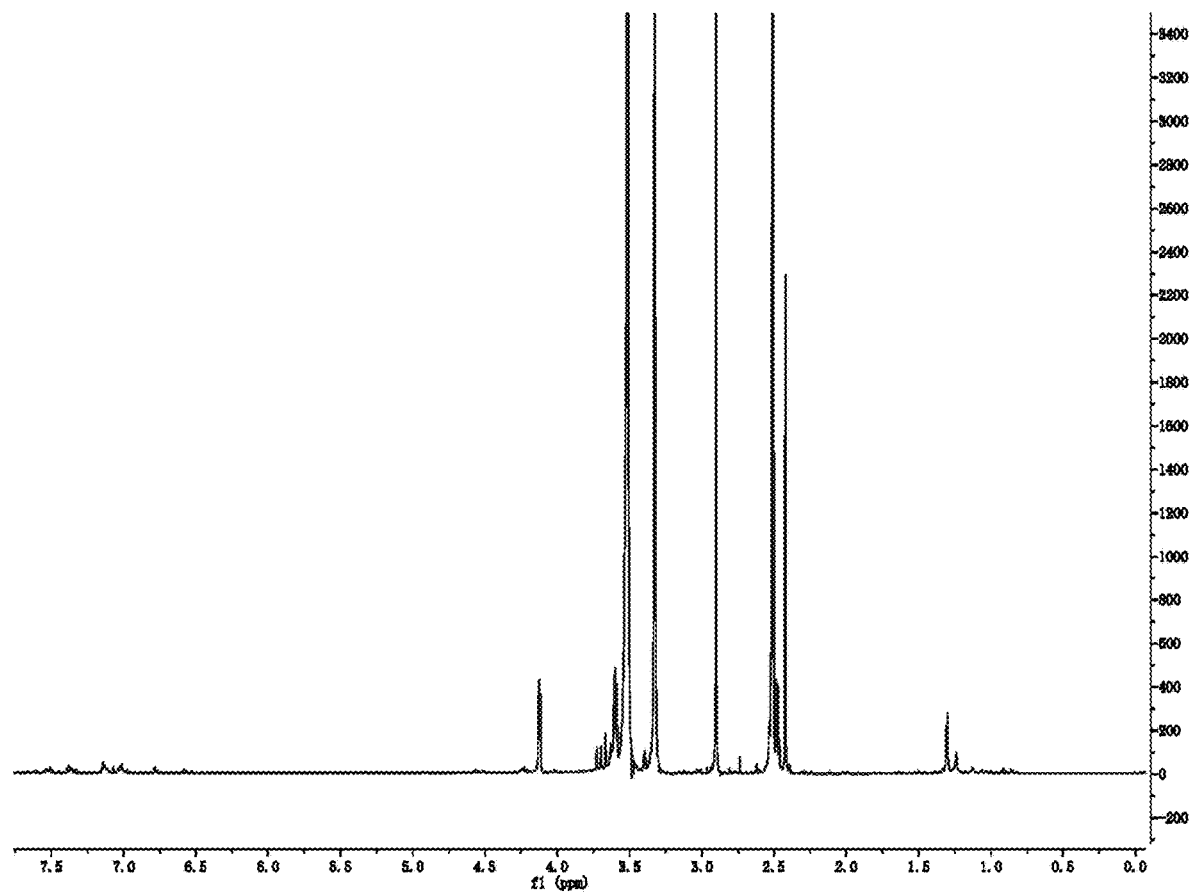
FIG. 3 shows the $^1$H NMR spectrum of diMT-Boc conjugate prepared in Example 1 of the present invention.
Figure 4:
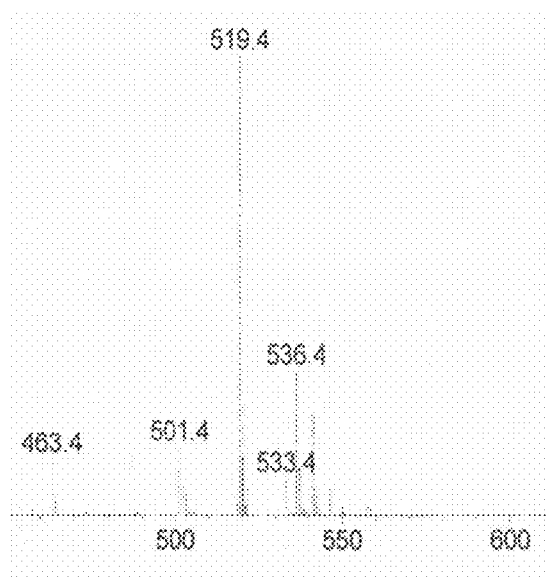
FIG. 4 shows the ESI-MS spectrum of diMT-Boc conjugate prepared in Example 1 of the present invention.

(2) Synthesis of diMT-Boc:

1-MT-Boc (38.9 mg, 0.067 mmol), DIPEA (34.98 μL, 3 eq.), and HBTU (14.25 μL, 1.5 eq.) were added into a clean and dry 25 mL round-bottom flask with a ground glass joint to dissolve in 8.5 mL of dry DMF, and stirred at 0° C. for 15 min, and then 1-MT (14.6, 0.067 mmol) was added into the mixture to react for 24 h. Then, an appropriate amount of 0.1 N HCl was added to terminate the reaction. The aqueous layer in the reaction solution was removed. The organic layer was washed twice with water and then dried with anhydrous sodium sulfate overnight. The dried product was loaded into a silica gel column by the dry method, and eluted with a mobile phase in a ratio of dichloromethane:methanol=10:1. The eluted solution were spotted on a plate for observation and collection. The eluted products were combined and evaporated to dryness under reduced pressure, to finally obtain a diMT-Boc conjugate (with a yield of 69%) with structure characterization shown in FIG. 3 and FIG. 4.

Figure 5:
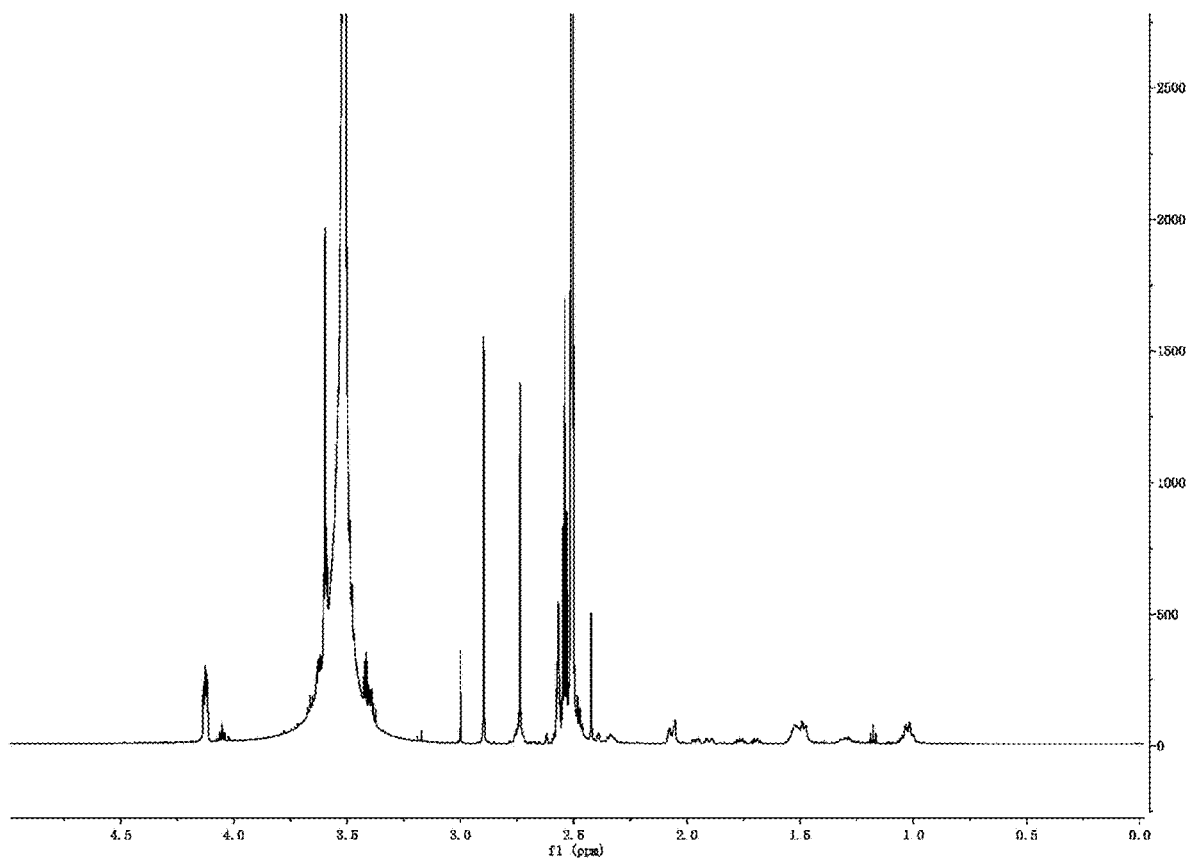
FIG. 5 shows the $^1$H NMR spectrum of OXA(IV)-PEG 2000 prepared in Example 1 of the present invention.

(3) Synthesis of OXA-PEG 2000 Conjugate:

First, the OXA(IV) prodrug was prepared by oxidation with 30% $H_2O_2$. OXA(IV) (52 mg, 0.12 mmol) and PEG 2000-COOH (252 mg, 0.12 mmol) were conjugated by activating the carboxyl group by thionyl chloride ($SOCl_2$, 1 mmol) on an oxygen-free Schlenk line to synthesize the OXA-PEG 2000 conjugate with structure characterization shown in FIG. 5.

Figure 6:
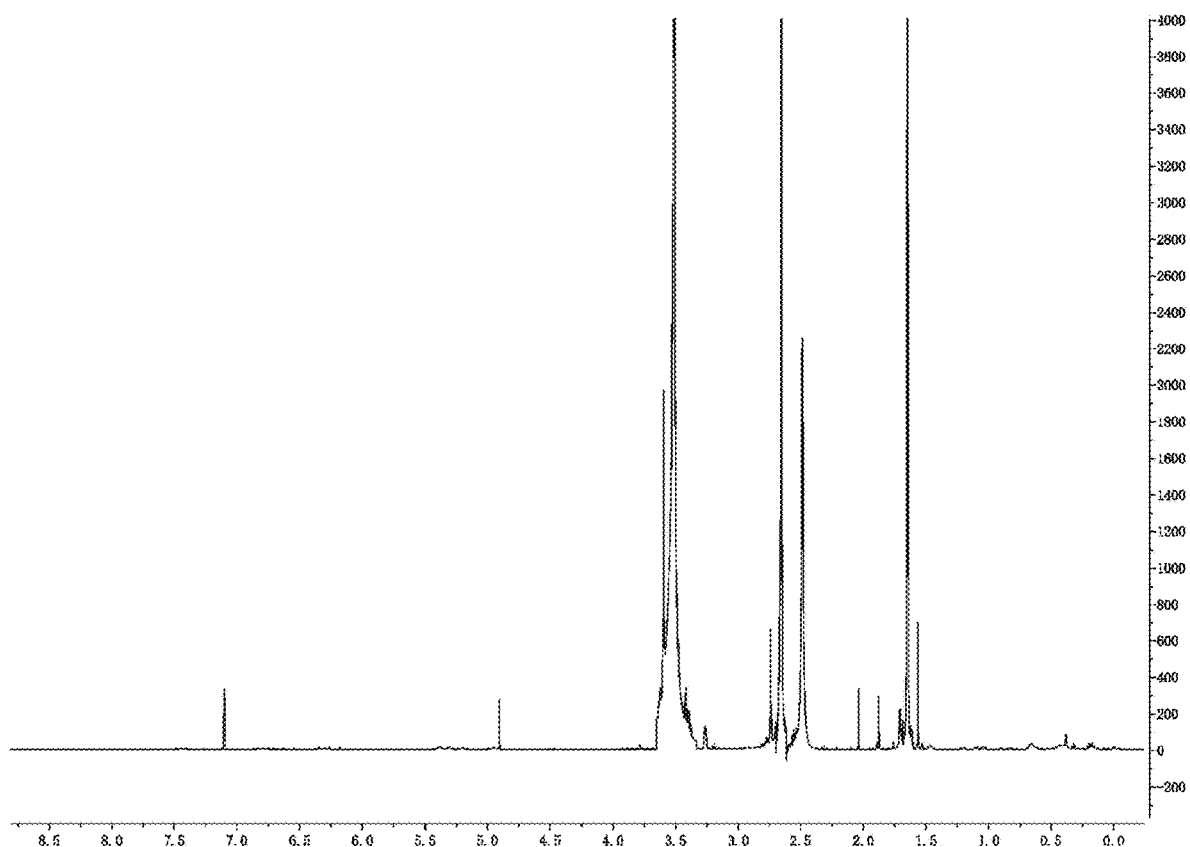
FIG. 6 shows the $^1$H NMR spectrum of diMT-OXA(IV)-PEG 2000 nanoconjugate prepared in Example 1 of the present invention.

(4) Preparation of diMT-OXA(IV)-PEG 2000 Nanoconjugate:

An OXA(IV)-PEG 2000 (300 mg, 0.12 mmol) suspension containing diMT-Boc (64 mg, 0.12 mmol), HBTU (50 mg, 0.13 mmol), and TEA (1 mmol) was added into 3 mL of DMF and stirred for 24 h. The resultant solution was filtered, then dissolved in ethanol, and precipitated with pre-cooled diethyl ether to obtain a yellow precipitate. The yellow precipitate was purified and dried to obtain a yellow solid (205 mg, with a yield of 68%) of diMT-OXA(IV)-PEG 2000 with Boc group. The product (160 mg, 0.117 mmol) was suspended in 10% TFA/DCM (V/V, 1 mL) at room temperature for 4 h. The solution was air-dried, then added into a large volume (40 mL) of cold diethyl ether dropwise, and then dissolved in a minimum amount (2 mL) of DCM. The resultant solution was centrifuged to collect a light yellow solid. The light yellow solid was washed for three times. Then, the production of diMT-OXA(IV)-PEG 2000 was confirmed in $^1$H-NMR (Applied Biosystems, API 4000), with structure characterization shown in FIG. 6. A dual-drug-based nanohybrid was prepared by nanoprecipitation. DiMT-OXA(IV)-PEG 2000 was dissolved in acetonitrile, and then added into water slowly within 10 min. The resultant solution was stirred at room temperature for 3 h to form a nanoconjugate, and then washed with Amicon ultra centrifugal filter with a molecular weight cutoff of 100 kDa for three times, to obtain a diMT-OXA(IV)-PEG 2000 nanoconjugate.

The reaction equations of the preparation process are as follows:

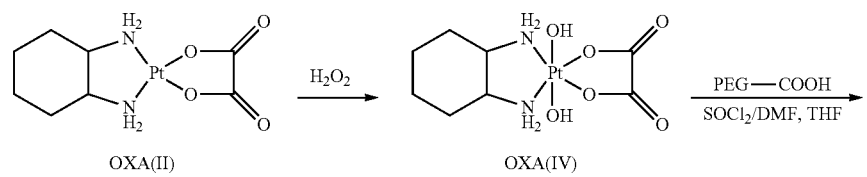

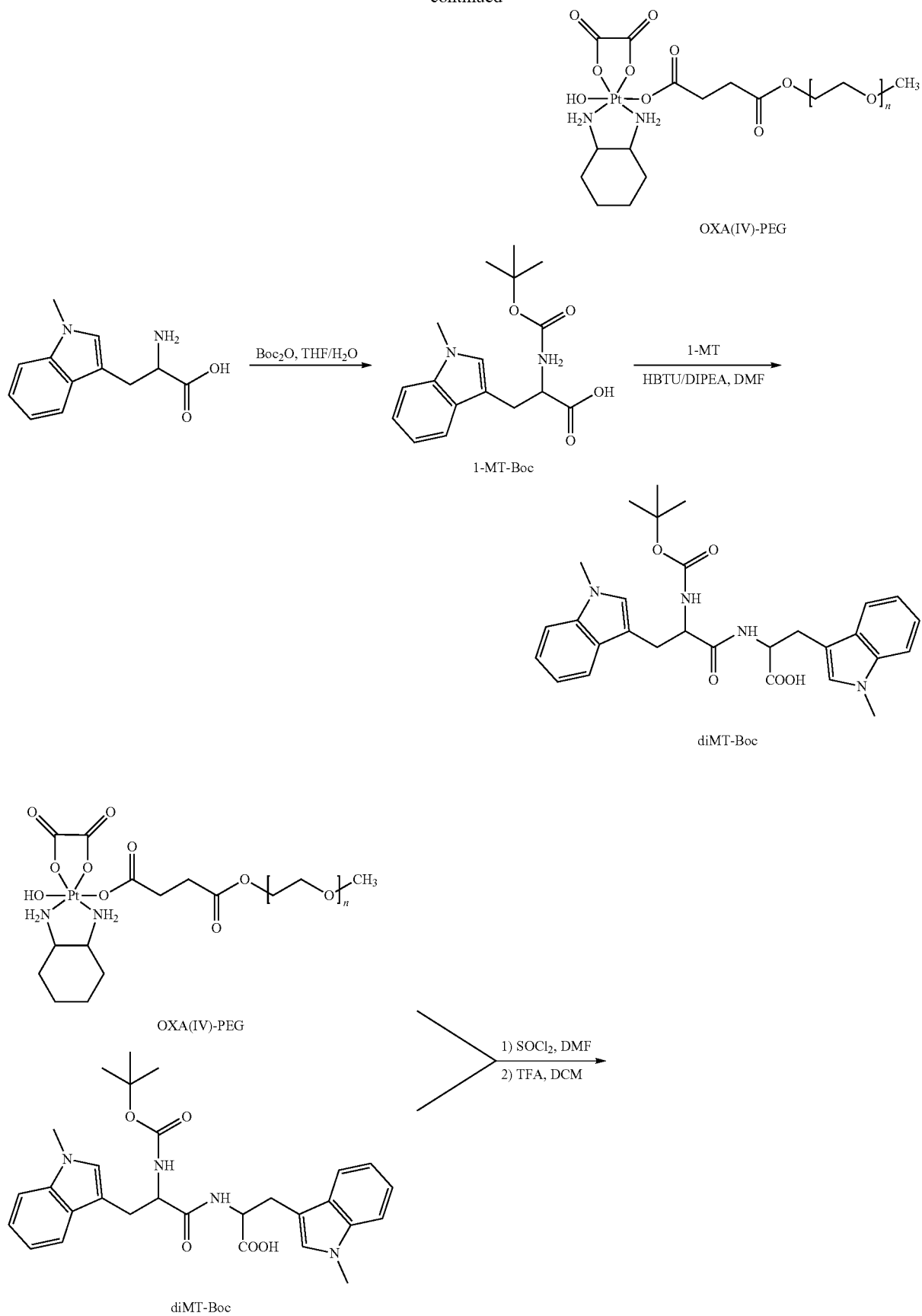

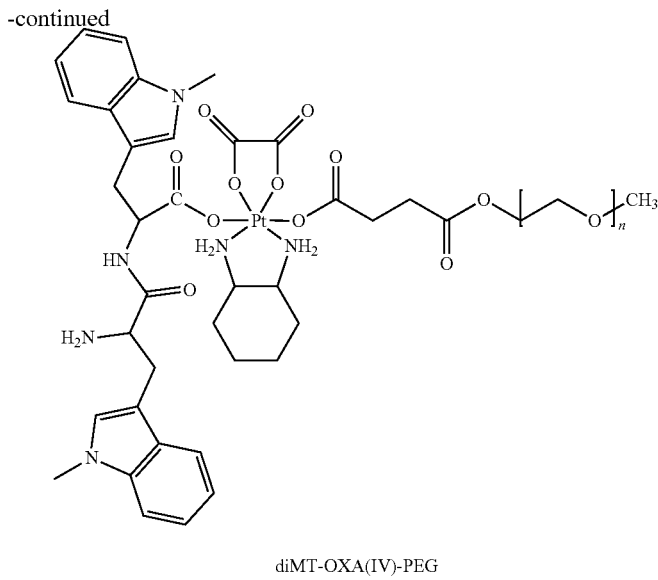

diMT-OXA(IV)-PEG

Example 2

Figure 7:
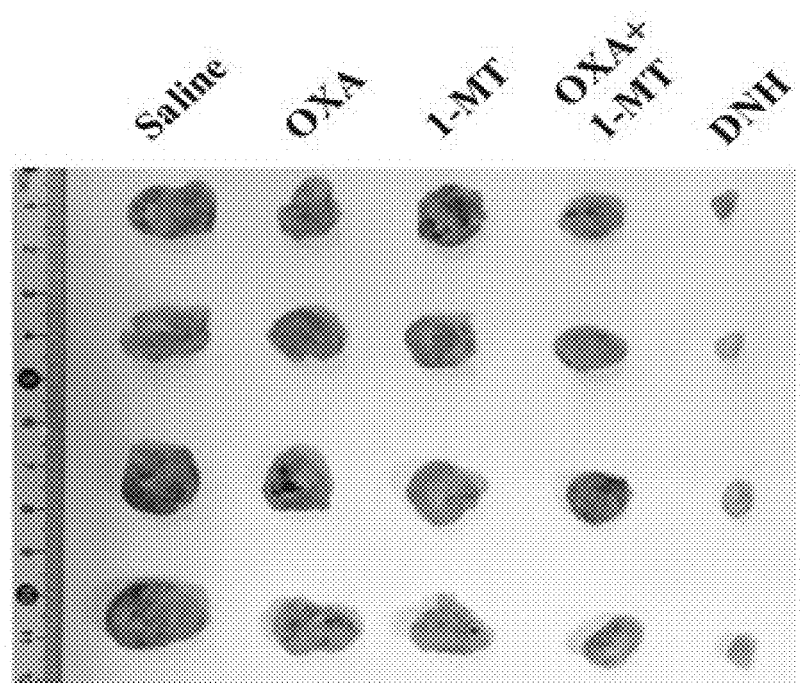
FIG. 7 shows tumor masses collected from experimental mice after the course of treatment for comparison of the inhibition of breast tumor growth by diMT-OXA(IV)-PEG 2000 nanoconjugate in Example 2 of the present invention.
Figure 8:
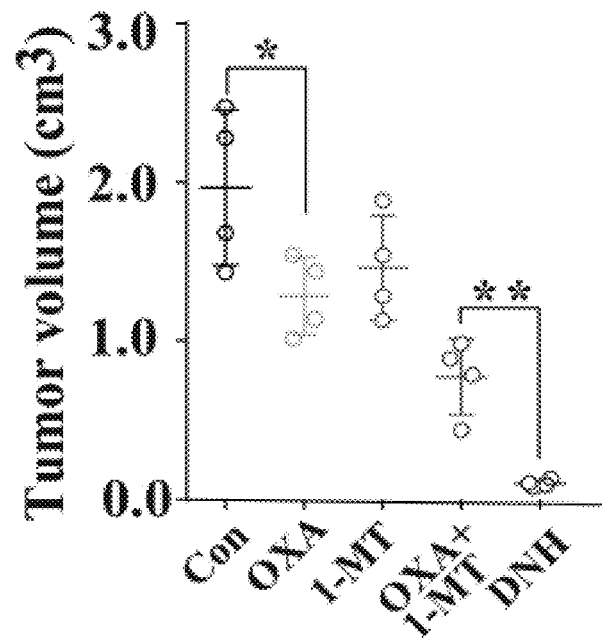
FIG. 8 shows quantification of tumor volume in mice treated with free OXA, free 1-MT, free 1-MT plus OXA, and diMT-OXA(IV)-PEG 2000 nanoconjugate, and were treated with saline as control in Example 2 of the present invention.

In Vivo Inhibition of Breast Tumor Growth by diMT-OXA(IV)-PEG 2000 Nanoconjugate To evaluate the efficacy of diMT-OXA(IV)-PEG 2000 nanoconjugate in inhibiting tumor growth in vivo, a model of animal with breast cancer was established. 4T1 cells were injected intravenously in BALB/c mice. 4T1 cells spontaneously generate tumors in BALB/c mice, and the characteristics of these tumors are very similar to breast cancer in humans. The BALB/c mice injected with 4T1 cells were treated every three days with free OXA, free 1-MT, free 1-MT plus OXA, and diMT-OXA(IV)-PEG 2000 nanoconjugate, and were treated with saline as control. After the course of treatment, tumor masses were collected from the experimental mice to measure tumor volume to assess general anti-tumor effects (see FIG. 7). It can be learned from FIG. 8 that the tumor volume is reduced in mice treated with free OXA, free 1-MT, and free 1-MT plus OXA, and the tumor volume is reduced in mice treated with diMT-OXA(IV)-PEG 2000 nanoconjugate to more than about 50% of that in mice treated with saline as control. These results show the potency and efficacy of diMT-OXA(IV)-PEG 2000 nanoconjugate in the treatment of breast tumors in vivo.

Figure 9:
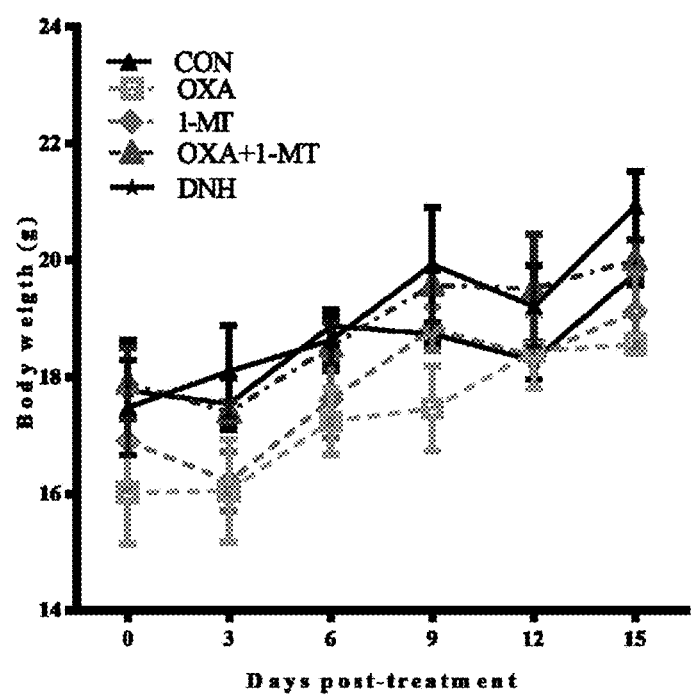
FIG. 9 shows the average weight of mice treated with free OXA, free 1-MT, free 1-MT plus OXA, and diMT-OXA (IV)-PEG 2000 nanoconjugate compared to the saline-treated control in Example 2 of the present invention.

Compared to the saline-treated control, the average weight of the mice treated with free OXA, free 1-MT, free 1-MT plus OXA, and diMT-OXA(IV)-PEG 2000 nanoconjugate is not significantly reduced (less than 15% loss) (see FIG. 9), indicating that the diMT-OXA(IV)-PEG 2000 nanoconjugate is well tolerated in vivo.

Experimental Example 3

In Vitro Anti-Tumor Viability Test of diMT-OXA(IV)-PEG 2000 Nanoconjugate

Figure 10:
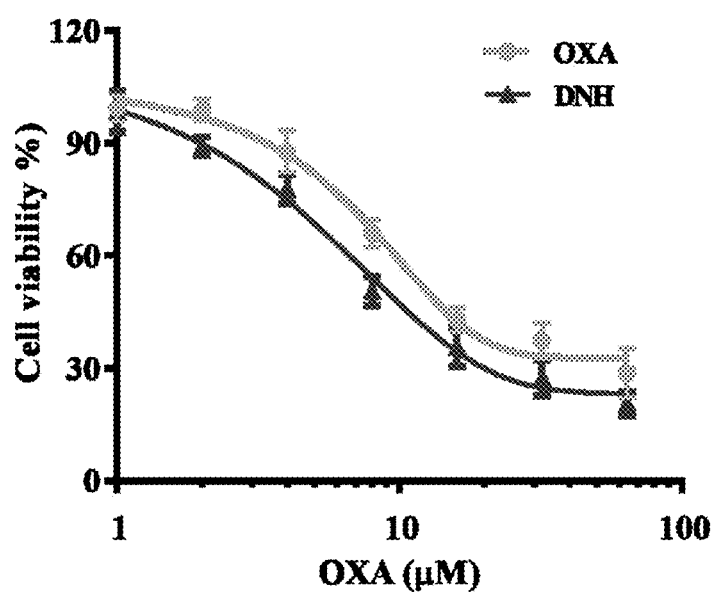
FIG. 10 shows the viability of 4T1 cells treated with different concentrations of free OXA and diMT-OXA(IV)-PEG 2000 nanoconjugate in Example 3 of the present invention.

4T1 cells were incubated in a 96-well plate (8000 cells/well) with a volume of 100 μL per well. After the incubation, the 96-well plate was placed in an incubator to culture at 37° C. under 5% $CO_2$ overnight. 100 μL of free OXA and diMT-OXA(IV)-PEG 2000 nanoconjugate (in different concentrations) were added. After culture in the incubator at 37° C. under 5% $CO_2$ for 48 h, 10 μL of CCK-8 solution was added into each well and then cultured in the incubator at 37° C. under 5% $CO_2$ for 2 h. The absorbance was measured at 450 nm by an ELISA reader, and the cell viability was calculated. As shown in FIG. 10, it can be learned from the results that both free OXA and diMT-OXA(IV)-PEG 2000 nanoconjugate have a good inhibitory effect on the proliferation of 4T1 cells, but the diMT-OXA(IV)-PEG 2000 nanoconjugate has a stronger inhibitory effect on 4T1 cells than the free OXA, further indicating that the OXA(IV) prodrug can be efficiently converted to active OXA in the intracellular redox environment.

The foregoing descriptions are merely preferred examples of the present invention and are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A PEGylated ICD inducer-IDO inhibitor nanoconjugate with a structural formula:

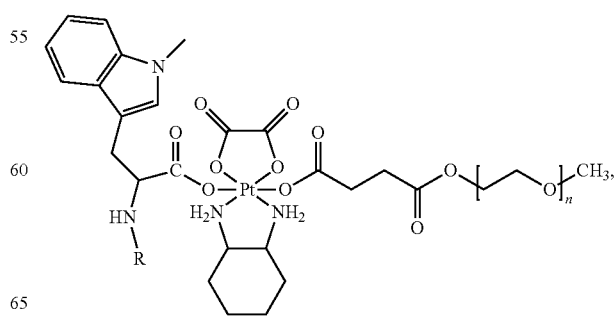

wherein R is H or

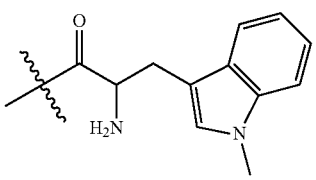 [SMILES: *C(=O)C(N)Cc1cn(C)c2ccccc12]

with a weight-average molecular weight of 1000-5000 Da.

2. A method for preparing the PEGylated ICD inducer-IDO inhibitor nanoconjugate according to claim 1, the method comprising: oxidizing oxaliplatin (OXA) to OXA oxide, modifying a hydroxyl group at an end of polyethylene glycol (PEG) into a carboxyl group with succinic acid or a derivative of succinic acid to obtain carboxylated PEG, carrying out esterification on the OXA oxide and the carboxylated PEG to obtain PEGylated OXA, and carrying out esterification on the PEGylated OXA and 1-methyl-D-tryptophan (1-MT) or a dimer of 1-MT, wherein the structural formula of the OXA oxide is

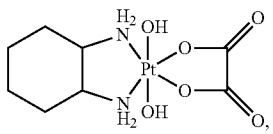

the structural formula of the carboxylated PEG is

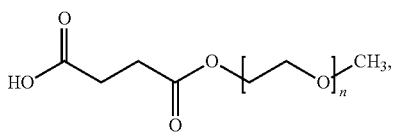

the structural formula of the PEGylated OXA is

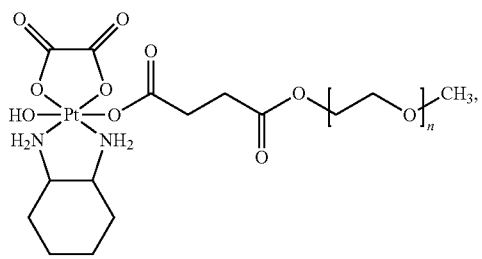

the structural formula of the dimer of 1-MT is

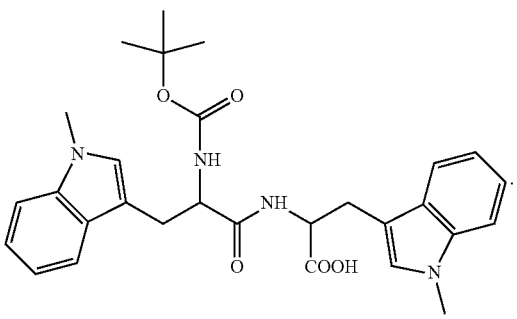 [SMILES: Cn1cc(CC(NC(=O)C(Cc2cn(C)c3ccccc23)NC(=O)OC(C)(C)C)C(=O)O)c2ccccc21]

3. The method for preparing the PEGylated ICD inducer-IDO inhibitor nanoconjugate according to claim 2, wherein OXA is oxidized to OXA oxide with an aqueous hydrogen peroxide solution.

4. The method for preparing the PEGylated ICD inducer-IDO inhibitor nanoconjugate according to claim 2, wherein a catalyst used for each esterification is HBTU.

5. The method for preparing the PEGylated ICD inducer-IDO inhibitor nanoconjugate according to claim 2, wherein a solvent used for each esterification is N,N-dimethylformamide (DMF).

6. The method for preparing the PEGylated ICD inducer-IDO inhibitor nanoconjugate according to claim 2, after carrying out the esterification on the PEGylated OXA and 1-methyl-D-tryptophan (1-MT) or a dimer of 1-MT, the method further comprising: suspending the obtained material in a dichloromethane solution containing trifluoroacetic acid, air drying, adding cold diethyl ether dropwise, dissolving it with dichloromethane, and carrying out centrifugation to obtain a precipitate.

7. The method for preparing the PEGylated ICD inducer-IDO inhibitor nanoconjugate according to claim 2, wherein the dimer of 1-MT is prepared by: protecting an amino group of 1-MT with a protecting group, and adding 1-MT to carry out amidation.

8. The method for preparing the PEGylated ICD inducer-IDO inhibitor nanoconjugate according to claim 7, wherein the protecting group is tert-butyloxycarbonyl (BOC).

9. The method for preparing the PEGylated ICD inducer-IDO inhibitor nanoconjugate according to claim 7, wherein the protecting is carried out with the protecting group by: reacting 1-MT with BOC anhydride under basic conditions.

10. The method for preparing the PEGylated ICD inducer-IDO inhibitor nanoconjugate according to claim 7, wherein a catalyst used for the amidation is N,N-diisopropylethylamine (DIPEA) and HBTU.

11. The method for preparing the PEGylated ICD inducer-IDO inhibitor nanoconjugate according to claim 7, wherein the amidation is carried out for 20-28 h.

12. The method for preparing the PEGylated ICD inducer-IDO inhibitor nanoconjugate according to claim 7, wherein hydrochloric acid is added to terminate the amidation after a specified time.

13. The method for preparing the PEGylated ICD inducer-IDO inhibitor nanoconjugate according to claim 7, wherein the material obtained after the amidation is washed with water and then purified by silica gel column chromatography.

14. The method for preparing the PEGylated ICD inducer-IDO inhibitor nanoconjugate according to claim 13, wherein a mobile phase for the silica gel column chromatography is a mixture of dichloromethane and methanol.

* * * * *